United States Patent [19]

Handa et al.

[11] Patent Number: 5,116,082
[45] Date of Patent: May 26, 1992

[54] ELECTROFUSION OF ELECTROFUSION JOINT, METHOD OF CONFIRMING STATE OF FUSION AND FUSION JOINT SUITABLE FOR USE IN THE METHODS

[75] Inventors: Takayuki Handa; Naotake Uda, both of Chiyoda, Japan

[73] Assignee: Mitsui Petrochemical Industries, Ltd., Tokyo, Japan

[21] Appl. No.: 383,015

[22] Filed: Jul. 21, 1989

[30] Foreign Application Priority Data

Jul. 21, 1988 [JP] Japan .................. 63-97084[U]

[51] Int. Cl.$^5$ ........................... F16L 35/00
[52] U.S. Cl. .......................... 285/21; 285/93; 219/535; 219/544; 156/274.2; 156/304.2
[58] Field of Search ............... 285/21, 93, 22; 156/304.1, 304.2, 304.6, 274.2; 219/535, 544

[56] References Cited

U.S. PATENT DOCUMENTS

| | | | |
|---|---|---|---|
| 3,943,334 | 3/1976 | Sturm | 219/535 |
| 4,117,311 | 9/1978 | Sturm | 219/544 |
| 4,147,926 | 4/1979 | Stähli | 285/93 X |
| 4,224,505 | 9/1980 | Sturm | 219/535 X |
| 4,313,053 | 1/1982 | Sturm | 285/21 X |
| 4,375,591 | 3/1983 | Sturm | 219/544 |
| 4,486,650 | 12/1984 | Bridgstock et al. | 219/544 |
| 4,727,242 | 2/1988 | Barfield | 285/21 X |
| 4,852,914 | 8/1989 | Lyall | 285/93 X |
| 4,869,533 | 9/1989 | Lehmann et al. | 285/21 |

FOREIGN PATENT DOCUMENTS

0173174  3/1986  European Pat. Off. ............ 285/93

Primary Examiner—Dave W. Arola
Assistant Examiner—Heather Chun
Attorney, Agent, or Firm—Sherman & Shalloway

[57] ABSTRACT

An electrofusion joint includes an electrical heating wire embedded in its inner peripheral region. The electrofusion joint can be fitted to an end of a plastic pipe. By supplying electrical current to the electrical resistance heating wire the interface between the joint and the pipe are fusion bonded. In order to allow easy determination of the completion of fusion bonding, the electrofusion joint is provided with an annular groove in the outer peripheral surface extending to a region of the joint near the electrical resistance heating wire. A pin or bar-like core member is located at and extends upwardly from the center of the groove. A stopper member is provided above the core to control the extent of projection of the pin or bar-like core such that any rise in pressure due to flow of molten resin in the groove of the joint which is transferred to the pin or bar-like core member enables confirmation that the fusion has been successfully accomplished by the observation of the limited movement of the stopping member with minimal flow of resin. Furthermore, as the stopper member is lifted by this pressure the electrical contact between the heating wire and electrical current supply is broken and further heating is terminated.

5 Claims, 4 Drawing Sheets

ELECTROFUSION OF ELECTROFUSION JOINT, METHOD OF CONFIRMING STATE OF FUSION AND FUSION JOINT SUITABLE FOR USE IN THE METHODS

BACKGROUND OF THE INVENTION

The present invention relates to a method of fusing an electrofusion joint having an electric resistance heating wire embedded therein, a method of confirming the state of fusion and an electrofusion joint suitable for use in such methods.

Electrofusion joints have been developed recently and are finding spreading use in various fields such as jointing of plastic pipes of water works, sewage pipes and gas pipes and in various forms such as a saddle joint, an elbow joint, a T joint and a cap joint. In general, an electrofusion joint is a molded article with an electrical resistance heating wire embedded therein. Fusion of this type of joint to a pipe is conducted by applying an electrical current at a constant voltage and for a predetermined time while fitting the joint on a pipe end or pressing the same against the pipe end so as to cause the interface to be molten thereby to melt and fuse the interface. In some cases, however, electrofusion is conducted without setting any definite time, i.e., by terminating the supply of electrical current upon detection of melting. For instance, the melting of the interface is detected by providing a detection hole b extending to the region near the electrical resistance heating wire a as shown in FIG. 11 and detecting the pressure of molten resin flowing into the hole by means of a pressure switch. According to the method of this type, bonding by fusion can simply be accomplished by fitting or pressing a joint to a pipe and then supplying an electrical current to the joint. Thus, electrofusion method of the type described enables the fusion bonding to be completed easily and in a short period of time as compared with the conventional method which requires the joint to be fitted or pressed to the pipe after thermally fusing the abutting surfaces of these joint and pipe. In addition, this type of method offers a comparatively high reliability of bonding by fusion.

One of problems encountered with this type of method is that completion of fusion cannot easily be confirmed through an appearance check, particularly when the length of time of the electrical power supply is fixed.

Conventionally, operators are obliged to lift, swing or pull the joint in order to confirm the pipe joint after the fusion, in order to confirm whether the fusion has been conducted safely.

Various other methods also have been proposed and used for the purpose of confirming the state of fusion. For instance, in one of these known methods, a detection hole 60 leading to a region in the vicinity of the electrical resistance heating wire is provided as shown in FIG. 4 and the state of fusion can be detected by observing the state of expansion of the molten resin through the hole 60. Alternately, a hole is formed in the joint so as to reach a region in the vicinity of the electrical resistance heating wire and a radially movable indicator is received in the hole so that the completion of fusion is confirmed by recognizing a radial movement of the indicator caused by spreading of the molten resin. In another known method, a temperature indicator tape capable of changing its color according to the temperature is adhered to the surface of the pipe joint so that the completion of fusion is detected through observation of the color of the temperature indicator tape.

The arrangement in which molten resin spreads into a hole leading to a region near the electrical resistance heating wire, as is the case of the aforementioned arrangement in which the fusion is detected by a pressure switch responsive to flow of molten resin into a hole, suffers from a problem in that a large quantity of molten resin is required for the purpose of confirmation of the fusion particularly when the joint has a large wall thickness because in such a case the volume of the hole is considerably large. In order to enable a visual check of the molten resin flowing out of the hole, it is necessary that the molten resin protrudes to a height of 5 mm or so above the pipe surface. This requires that a significantly large quantity of molten resin flows into the hole and, therefore, that the fluidity of the resin around the interface between the joint and the pipe increases to such a high level as to cause various troubles such as overheating due to short-circuiting of electrical resistance heating wire, reduction in the pressure of the molten resin around the interface, deformation of the joint or the pipe in amount corresponding to the quantity of the resin which has been spread into the hole resulting in a large residual internal stress to reduce the quality of the bonding by fusion. In the method which relies upon the spreading of the molten resin out of the hole, it has been difficult to adequately control the quantity of the resin flowing out of the hole regardless of the conditions such as the size of the gap between the environmental temperature, the size of the gap between the pipe and the joint, and so forth.

The method which relies upon a radially movable indicator also is disadvantageous in that the indicator tends to move by vibration or force of gravity applied to the joint with the result indication indicative of completion of fusion bonding is made even when the bonding actually has not been done.

The method which makes use of a temperature indication tape does not cause any adverse effect on the fusion performance because it does not require spreading or flowing of the molten resin out of the joint. With this method, however, it is difficult to exactly predict the molten resin temperature which are important factor of the fusion from the exterior of the joint. Thus, the method relying upon the temperature indicator tape tends to suffer a large error. In general, where the ambient air temperature is around 20° C., the temperature of the joint surface does not rise beyond 60° C. when the inner surface of the joint has been molten. To enable the fused state to be detected correctly, therefore, the tape has to be selected such that its color is changed at, for example, 50° C. Such a tape will easily change its color when irradiated directly with sunlight in summer. Thus, the method which makes use of the temperature indicator tape is also unsatisfactory from a practical point of view.

SUMMARY OF THE INVENTION

Accordingly, an object of the present invention is to provide an electrofusion method which employs a pressure detection method capable of fusing a joint without adversely affecting the fusion performance of the joint.

Another object of the present invention is to provide a method which enables an easy confirmation of the state whether the fusion has been safely completed.

Still another object of the invention is to provide an electrofusion joint suitable for use in carrying cut the above-mentioned electrofusion method and the confirming method.

To this end, according to one aspect of the present invention, there is provided an electrofusion method in which an electrofusion joint having an electrical heating wire embedded in the inner peripheral region thereof is fitted on or laterally pressed against an end of a resin pipe and electrical current is supplied to the electrical resistance heating wire so as to melt and fuse the electrofusion joint, the method comprising: preparing the joint such that an annular groove is formed in the outer peripheral surface of the joint to reach a region near the electrical resistance heating wire, the annular groove defining a pin- or bar-like core which serves as a pressure-transmitting member; installing a pressure switch such that any rise in the pressure due to fusion of the joint is detected by the pressure switch through the core; and terminating the supply of the electrical current to the electrical resistance heating wire in response to detection of the pressure by the pressure switch through the core.

According to another aspect of the present invention, there is provided a method of confirming the state of fusion of an electrofusion joint having an electrical heating wire embedded in the inner peripheral region thereof, the electrofusion joint being fitted to an end of a plastic pipe and the electrical resistance heating wire being supplied with electrical current so that the interface between the joint and the pipe is fused to bond the joint and the pipe, the method comprising: preparing the joint such that a detection hole is formed in the outer peripheral surface of the joint to reach a region near the electrical resistance heating wire; covering the detection hole with a lid of heat-resistant material during execution of the electrofusion process; inspecting, through the lid, the state of flowing of molten resin into the detection hole during execution of the electrofusion process; and visually checking whether the fusion has been done successfully, by removing the lid after solidification of the resin.

According to a further aspect of the present invention, there is provided an electrofusion joint having an electrical heating wire embedded in the inner peripheral region thereof, the electrofusion joint being adapted to be fitted to an end of a plastic pipe and the electrical resistance heating wire being adapted to be supplied with electrical current so that the interface between the joint and the pipe is fused to bond the joint and the pipe, the electrofusion joint comprising: a detection hole formed in the outer peripheral surface of the joint to reach a region near the electrical resistance heating wire; a transparent or translucent heat-resistant lid embedded in or fixed to the joint so as to close the detection hole.

According to still further aspect of the present invention, there is provided an electrofusion joint having an electrical heating wire embedded in the inner peripheral region thereof, the electrofusion joint being adapted to be fitted to an end of a plastic pipe and the electrical resistance heating wire being adapted to be supplied with electrical current so that the interface between the joint and the pipe is fused to bond the joint and the pipe, the electrofusion joint comprising: an annular groove formed in the outer peripheral surface of the joint to reach a region near the electrical resistance heating wire; so as to define a pin- or bar-like core; and a stopper member provided above the core and capable of limiting the lift of the core.

DESCRIPTION OF THE PREFERRED EMBODIMENTS

Figure 1:
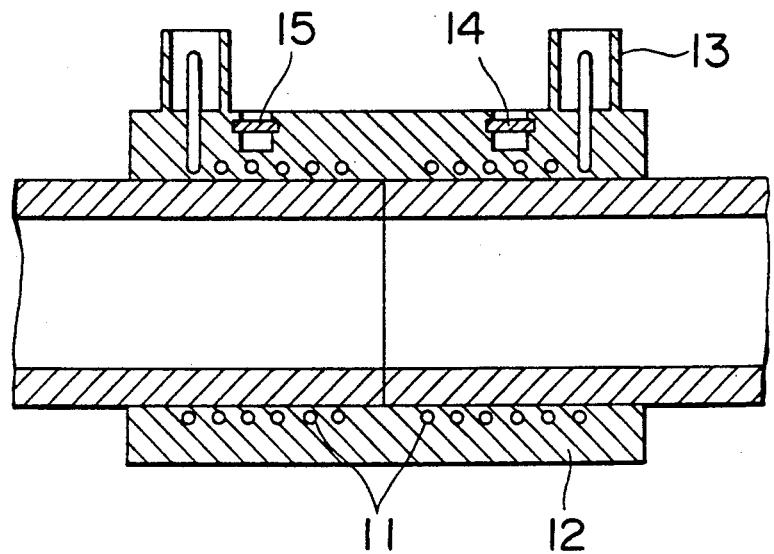
FIG. 1 is a sectional view of an embodiment of an electrofusion joint in accordance with the present invention.

According to the method of the invention for fusing an electrofusion joint by making use of a pressure detection system, the electrofusion joint which has an electrical heating wire embedded therein is fitted or laterally pressed to a plastic pipe and then electrical current is supplied to the electrical resistance heating wire thereby to fuse the joint, wherein the joint is provided with an annular groove which reaches to a region near the electrical resistance heating wire and a pin- or bar-like core member is provided at the center of the groove so that the pressure of the molten resin is detected by a pressure switch through the core, and the supply of the electrical current is terminated when a predetermined pressure of the molten resin is detected by the pressure switch.

The invention also provides a method of confirming the state of fusion of an electrofusion joint having an electrical resistance heating wire embedded therein, the fusion being conducted by fitting or laterally pressing the joint to a pipe and then supplying electrical current to the electrical resistance heating wire, wherein a detection hole reaching a region near the electrical wire is formed in the joint, the hole being normally covered with a heat-resistant lid so that the molten resin flowing into the hole is sensed through the heat-resistant lid or, alternatively, the lid is removed after the solidification of the resin to enable visual check of the state of fusion.

According to another confirming method, the joint is provided with an annular groove reaching a region near the electrical resistance heating wire and a pin- or bar-like core is provided in the center of the groove and a stopping member is provided for limiting the amount of projection of the core which is lifted up by the pressure of molten resin during the fusion. Whether the fusion has been safely accomplished is detected by detecting projection of the core through checking the state of the stopping member, a visual check from a lateral direction, or by inspection after removal of the stopping member.

In the confirming method which relies upon the observation of the state of the resin flowing into the detection hole or projection of the core through visual check through the lid or the stopping member, the lid or the stopping member may be embedded in or fixed to the joint or, alternately, the lid or the stopping member may be detachably secured to the joint. When such lid or pressing member closing or covering the detection hole is used, the lid or the stopping member is preferably made of a transparent or translucent material. Alternately, a small inspection hole is formed in the lid or the stopping member. The transparent or translucent lid or stopping member is typically made of a glass. This, however, is not exclusive and the lid or the stopping member may be made of other suitable light-transmitting material which has a high heat-resistance to withstand the temperature of molten resin (120°-130° C.) and which can bear the pressure of the molten resin which is generally 0 to 5 kgf/cm². Such an arrangement is illustrated in FIG. 9.

Figure 9:
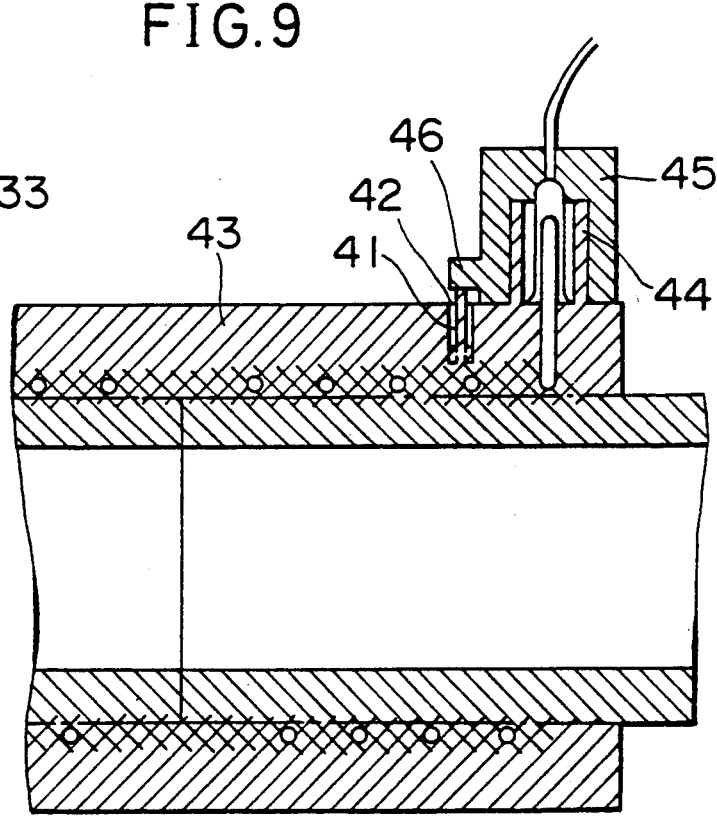
FIG. 9 is a sectional view of a further embodiment of the electrofusion joint of the present invention.

The arrangement illustrated in FIG. 9 also may be such that a gap for enabling inspection is formed between the inner surface of the hole and the lid. The stopping member need not always be designed such as to surround the entire circumference of the detection hole but may be designed such that it is opened at a portion or the whole of the circumference. In such a case, the small inspection hole or the gap serves also as a vent hole.

When a detachable lid or a detachable pressing member is used in the embodiment illustrated in FIG. 9, such lid or stopping member may be formed as a single piece or member or may be formed integrally with a connector which is detachably inserted into a socket in the electrofusion joint so as to be detached together with the connector. In such a case, the electrofusion joint includes such a connector.

When a detachable lid is used, it is preferred that a small hole or a small groove provided with an air vent is formed in a portion of the detachable lid corresponding to the detection hole inside the lid, such that the molten resin is allowed to flow into the small hole or the small groove through the detection hole. Preferably, the small groove is an annular groove so that it may be communicated with the detection hole regardless of the rotational position of the lid.

The lid may be made of a metallic plate made of a sheet of a metal having a high heat conductivity and high heat-radiation effect, e.g., aluminum, iron or copper, so that the molten resin flowing out of the joint is immediately cooled and solidified on the joint surface. Such a metal sheet may be provided with a small hole for inspection or, alternatively, an inspection gap may be formed between the lid and the wall of the detection hole. It is also possible to adopt a grid-like lid.

In the electrofusion joint of the type described above, electrical current is supplied to the electrical resistance heating wire so that heat is generated to elevate the temperature of the resin near the electrical resistance heating wire to melt the same. In such a state, the molten resin around the electrical resistance heating wire is thermally expanded to generate an internal pressure. According to the fusion method of the present invention which makes use of the aforementioned pressure detection system, the pressure rise of the molten resin is detected by the pressure switch through the core without requiring the molten resin to flow and spread. Upon detection of the rise in the molten resin pressure, the pressure switch delivers a signal for terminating the supply of the electrical current to the electrical resistance heating wire. When the joint is provided with a detection hole, the resin providing the bottom of the detection hole is molten so that the molten resin flows into the detection hole by the above-mentioned internal pressure. When the detection hole is hermetically closed by the lid, the flow of the molten resin into the detection hole is continued until a balance or an equilibrium state is attached between the above-mentioned internal pressure of the molten resin and the pressure in the detection hole. However, when the air vent small hole or a gap is provided, the molten resin completely fills the detection hole, but it does not flow out of the joint because the lid closes the detection hole. The molten resin which has come into the detection hole is visually confirmed through the transparent or translucent lid or through the small inspection hole or the gap between the lid and the wall of the detection hole.

In the embodiment of the type which employs a pin- or bar-like core, a rise in the internal molten resin pressure causes the detection pin- or bar-like bar to be lifted and stopped by the stopping member. In consequence, the amount of the molten resin which flows out of the joint is decreased. The safe accomplishment of the fusion is confirmed through the detection of the contact between the pin- or bar-like member.

When an opaque lid or cap-like stopping member is used, it is impossible to visually check the inside of the detection hole without removing such a lid or cap. In this case, therefore, the lid or the pressing member is removed after the solidification of the resin so as to enable confirmation of the state of bonding by fusion. This confirmation can be done more easily and more quickly when the case where a small inspection hole or a small groove is provided in the lid because, in such a case, a small projection or ridge corresponding to the small inspection hole or the small groove is formed on the resin after the removal of the lid so as to provide means indicative of the completion of the fusion.

In the case where the lid has a cooling function, the leading end of the molten resin filling the detection hole contacts with the lid so as to be cooled and solidified thus stopping further spreading of the molten resin into the hole. In this case, the completion of fusion bonding is conducted by visually checking the molten resin through the small inspection hole formed in the lid or through the gap between the lid and the wall of the hole.

Embodiments of the electrofusion joint of the present invention will be described with reference to the accompanying drawings.

Figure 2:
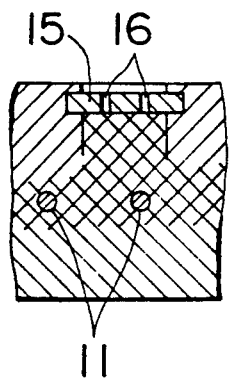
FIG. 2 is an enlarged view of an essential portion of the electrofusion joint of FIG. 1 in a state after fusion.

The attached Figure show an electrofusion joints of intended for use as a pipe joint for connecting plastic tubes. The electro-fusion joint, generally denoted by 12, has an electrical resistance heating wire 11 embedded in the region adjacent to the inner peripheral surface thereof. Detection holes 14 are formed so as to extend radially inwardly to a region near the electrical resistance heating wire 11 at portions near sockets 13 which are provided on the left and right ends of the joint 12 as viewed in the figure. The arrangement is such that, when the electrofusion joint is heated and molten, the portion of the resin material of the joint flows into these detection holes. Each hole is closed by a pyrex glass sheet 15 embedded in the resin of the joint 12, as shown in FIG. 1. The glass sheet 15 is provided with vent holes 16 as shown in FIG. 2 so as to allow the molten resin to flow into the detection hole 14 without encountering substantial resistance.

In use, electrical connectors (not shown) are inserted into the sockets 13 so as to supply the electrical heating wire with an electrical current. In consequence, the molten resin flows into the detection hole 14 so as to be visually recognized through the glass sheet 15, thus enabling the confirmation of completion of the fusion bonding.

Figure 3:
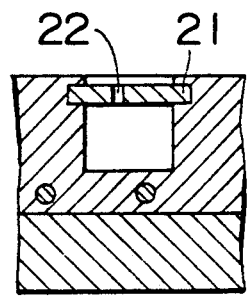
FIG. 3 is a sectional view of an essential portion of still another embodiment.
Figure 4:
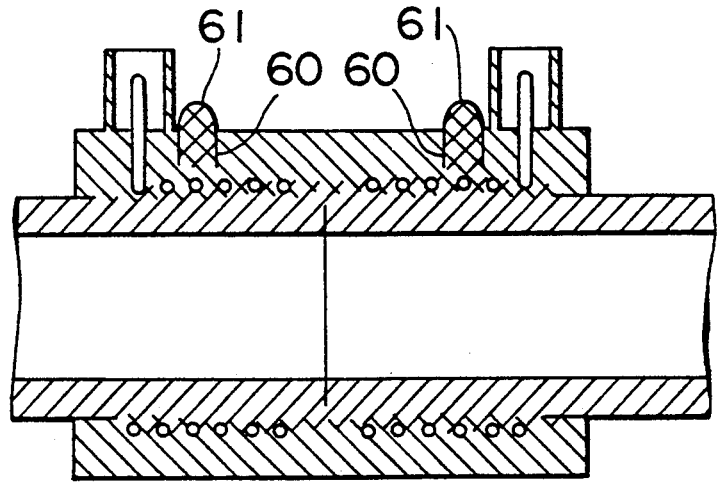
FIG. 4 is a sectional view of a conventional electrofusion joint.

FIG. 3 shows another embodiment in which the pyrex glass sheet of the embodiment shown in FIG. 1 is substituted by an aluminum plate 21 having a small inspection hole 22. Confirmation of state of fusion bonding is conducted by visually checking the state of the molten resin flowing into the detection hole 14 through the small inspection hole 22.

Figure 5:
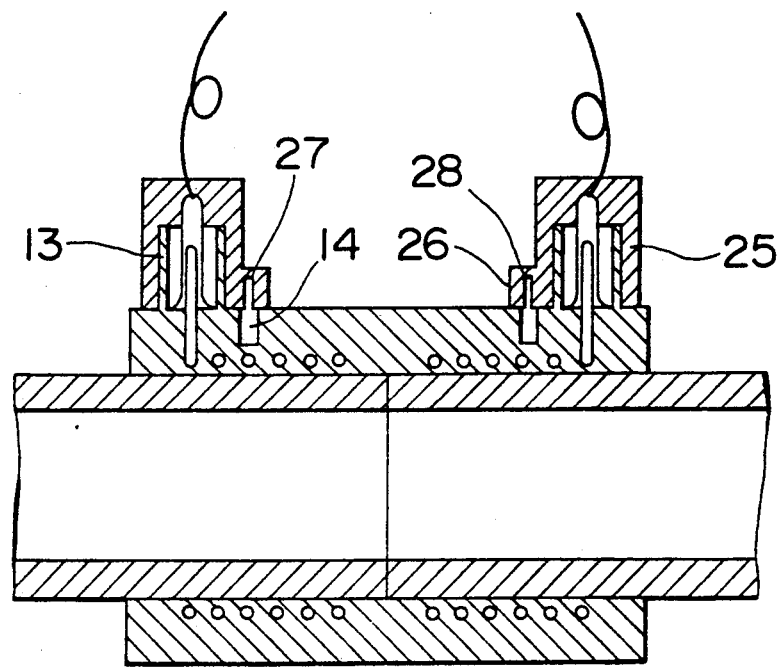
FIGS. 5 and 6 are sectional views of still another embodiment of the electrofusion joint in state before and after the fusion, respectively.
Figure 6:
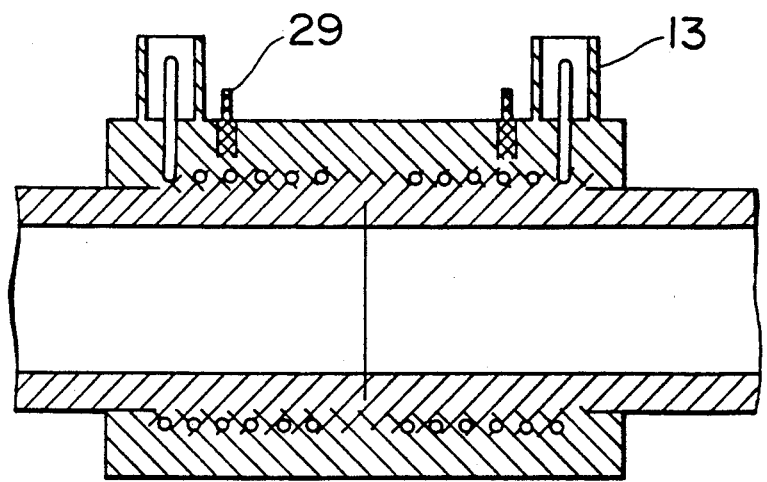

FIG. 5 shows another embodiment in which a lid 26 is formed integrally with each connector 25 such that the detection hole 14 is covered by the associated lid 26 when the connector 25 integral with this lid 26 is inserted into the corresponding socket 13. The lid 26 is provided with a small hole or a small groove 27 at a portion thereof corresponding to the detection hole 14. A numeral 28 designates an air vent hole.

In use, each connector 25 is inserted into the socket 13 while being rotationally located such that the lid 26 integral therewith covers the detection hole 14. Subsequent supply of the electrical power to the electrical heating wire causes the resin material of the joint to be molten and the molten resin flows into each detection hole 14. The connector 25 is withdrawn after solidification of the resin. In consequence, a projection 29 is left on the surface of the joint so as to indicate that the fusion bonding has been safely completed.

Figure 7:
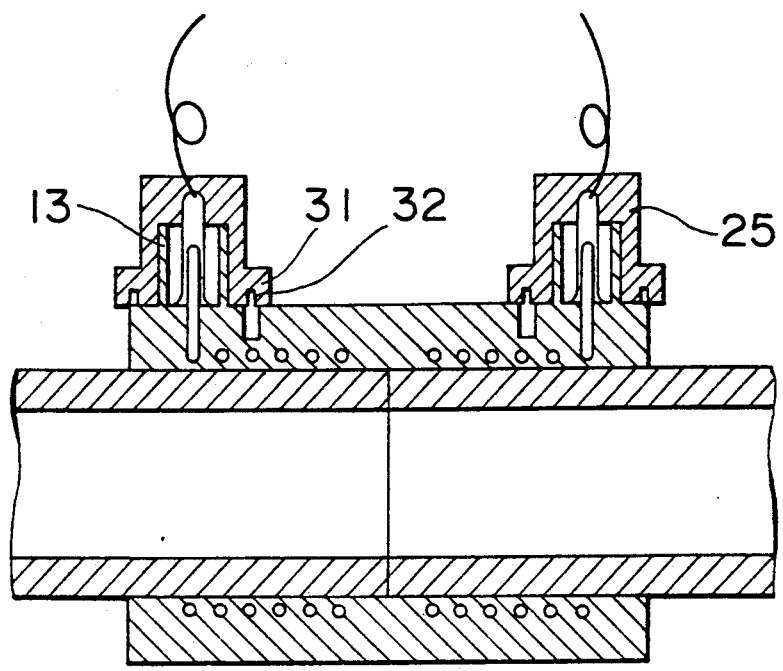
FIG. 7 is a sectional view of still another embodiment of the electrofusion joint of the present invention.
Figure 8:
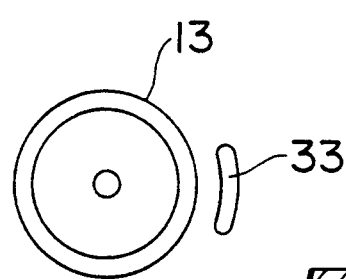
FIG. 8 is a plan view of an essential portion of the electrofusion joint of FIG. 7 in a state after the fusion.

FIG. 7 shows a modification of the embodiment of FIG. 5. In this modification, a flange-like lid 31 is formed on the lower end of the connector 25 integrally therewith. A small annular groove 32 is formed in the bottom surface of the lid 31. When the connector 25 is detached after completion of the fusion, an arcuate protrusion 33 appears on the surface of the joint as shown in FIG. 8.

FIG. 9 shows a different embodiment in which an annular groove 42 is formed in the outer surface of the joint 43. A pin-shaped core 41 is formed in the center of the annular groove 42. A stopping member 46 is formed on a connector 45 which is to be inserted into a socket 44 such that the stopping member 46 covers the detection hole when the connector 45 is inserted into the socket 44.

Figure 10:
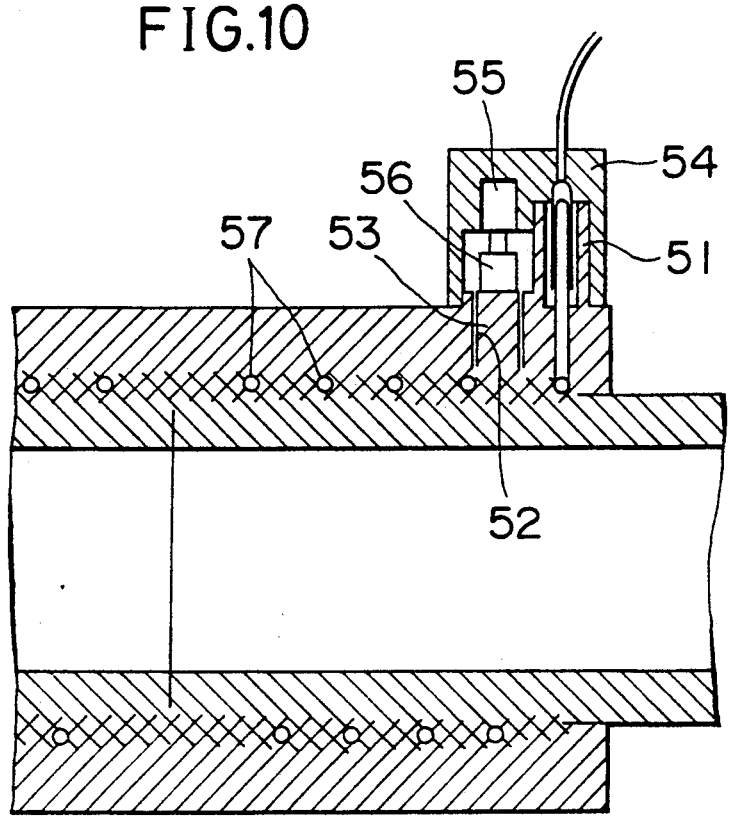
FIG. 10 is a sectional view of a further embodiment of the electrofusion joint of the present invention.
Figure 11:
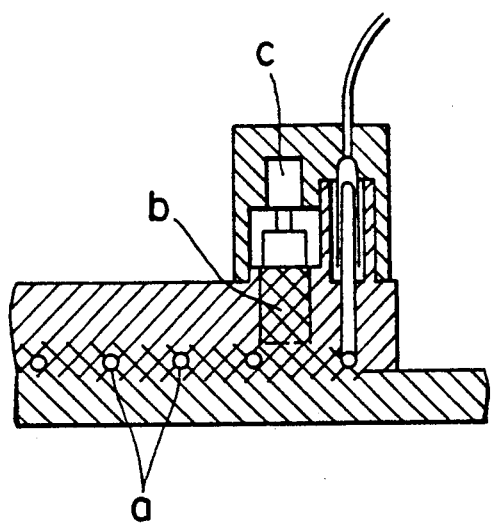
FIG. 11 is a sectional view of an essential portion of a conventional electrofusion joint.

FIG. 10 shows a different embodiment in which a pressure-transmitting bar-like core 53 is formed by an annular groove 52 formed in the vicinity of the socket 51. On the other hand, a connector 54 is provided with a pressure switch 55 having a piston 56 which is capable of engaging with the core 53 when the connector 54 is inserted into the socket 51. After the start of the supply of the electrical power, the resin of the portion of the joint around the electrical resistance heating wire 57 is molten so as to expand thereby raising the internal resin pressure. The raised internal resin pressure causes the core 53 to be displaced so that the pressure detection switch 55 is detected with the result that a switch (not shown) in a power supply circuit is opened thereby ceasing the electrical power supply.

Thus, in the embodiment shown in FIG. 10, the fusion of the joint is detected by a pressure switch through a pressure-transmitting core which is defined by an annular groove formed to reach a region near the electrical resistance heating wire, and the supply of the electrical power is terminated when the pressure of the molten resin at the fusion region is detected by the pressure switch through the pressure transmitting core. With this arrangement, it is possible to detect the pressure without causing any portion of the molten resin to flow out of the joint regardless of the wall thickness of the joint. It is therefore possible to eliminate problems encountered with conventional method relying upon a pressure detection system, i.e., short-circuiting in the electrical resistance heating wire and deterioration of the fusing performance which are attributable to excessively high fluidity of the molten resin.

According to the electrofusion joint of the invention which employs a lid covering the detection hole, the molten resin is prevented from flowing outside the joint through the detection hole because the detection hole is covered by a lid. In consequence, the degradation in the fusion performance which may otherwise be caused by a too large quantity of molten resin flowing into the detection hole is avoided. In addition, whether the fusion has been accomplished safely can be easily detected by a visual check through the lid or after removal of the lid.

When a lid made of a metallic material is used, the cooling of the molten resin is promoted so as to minimize the quantity of the resin flowing out of the joint.

The embodiment in which the lid is integrated with a connector for electrical power supply is advantageous in that the closing and opening of the detection hole can be done automatically in accordance with the mounting and demounting of the connector.

When the lid is provided with a small hole or a small groove corresponding to the detection hole, a protrusion is formed on the surface of the joint so as to enable an easy visual check.

When the above-mentioned small groove is formed in an annular form, the socket can be inserted in a random orientation so that the work for connecting pipes through the joint is facilitated advantageously.

Provision of a small air vent hole or air vent gap ensures that the molten resin fills the detection hole and the small vent hole or small groove without substantial resistance.

The following advantages are brought about by the embodiment which employs a pin-like core formed by an annular groove formed in the joint so as to reach a region near the electrical resistance heating wire and a stopping member provided above the core so as to limit the amount of projection of the core. Namely, since the amount of projection of the core is limited by the stopper member, the quantity of the molten resin flowing into the bore also is limited so as to eliminate any unfavorable effect on the fusion performance attributable to flowing of an excessively large quantity of molten resin. In addition, whether the fusion bonding has been sucessfully accomplished can be detected by a visual check of the state of the core from a lateral side of the joint or after removal of the stopper member.

The stopper member may be fixed to the joint or may be provided integrally with a connector for the electrical power supply so that the pressing member can be set or demounted from the core in accordance with the insertion and withdrawal of the connector into and out of the socket.

What is claimed is:

1. An electrofusion joint having an electrical heating wire embedded in the inner peripheral region thereof, said electrofusion joint being adapted to be fitted to an end of a plastic pipe and said electrical resistance heating wire being adapted to be supplied with electrical current so that the interface between said joint and said pipe may be fused to bond said joint and said pipe, said electrofusion joint comprising: an annular groove formed in the outer peripheral surface of said joint and extending to a region near said electrical resistance heating wire: a core member extending upwardly from said groove above the outer peripheral surface of said joint; and a stopper member provided above said core member and capable of limiting the lift of said core member in response to pressure exerted on said core member by molten joint material formed in said groove when electrical current is supplied to said heating wire.

2. An electrofusion joint according to claim 1, wherein said stopper member has a cap-like form and is made of at least translucent material, whereby the fusion bond formed between said joint and pipe may be observed through said material, said stopper member being installed so as to cover said annular groove from the upper side of said annular groove.

3. An electrofusion joint according to claim 1, wherein said stopper member is provided to surround said annular groove, with at least part of its circumference opened.

4. An electrofusion joint according to claim 1, wherein said stopper member is detachably mounted on said fusion joint.

5. An electrofusion joint according to claim 5, wherein said stopper member is detachably inserted into a socket formed in said electrofusion joint to complete an electrical circuit with said electrical resistance heating wire, whereby projection of said core member against said stopper member following fusion bonding between said joint and said pipe causes said electrical circuit to be disconnected.

* * * * *